UNITED STATES PATENT OFFICE.

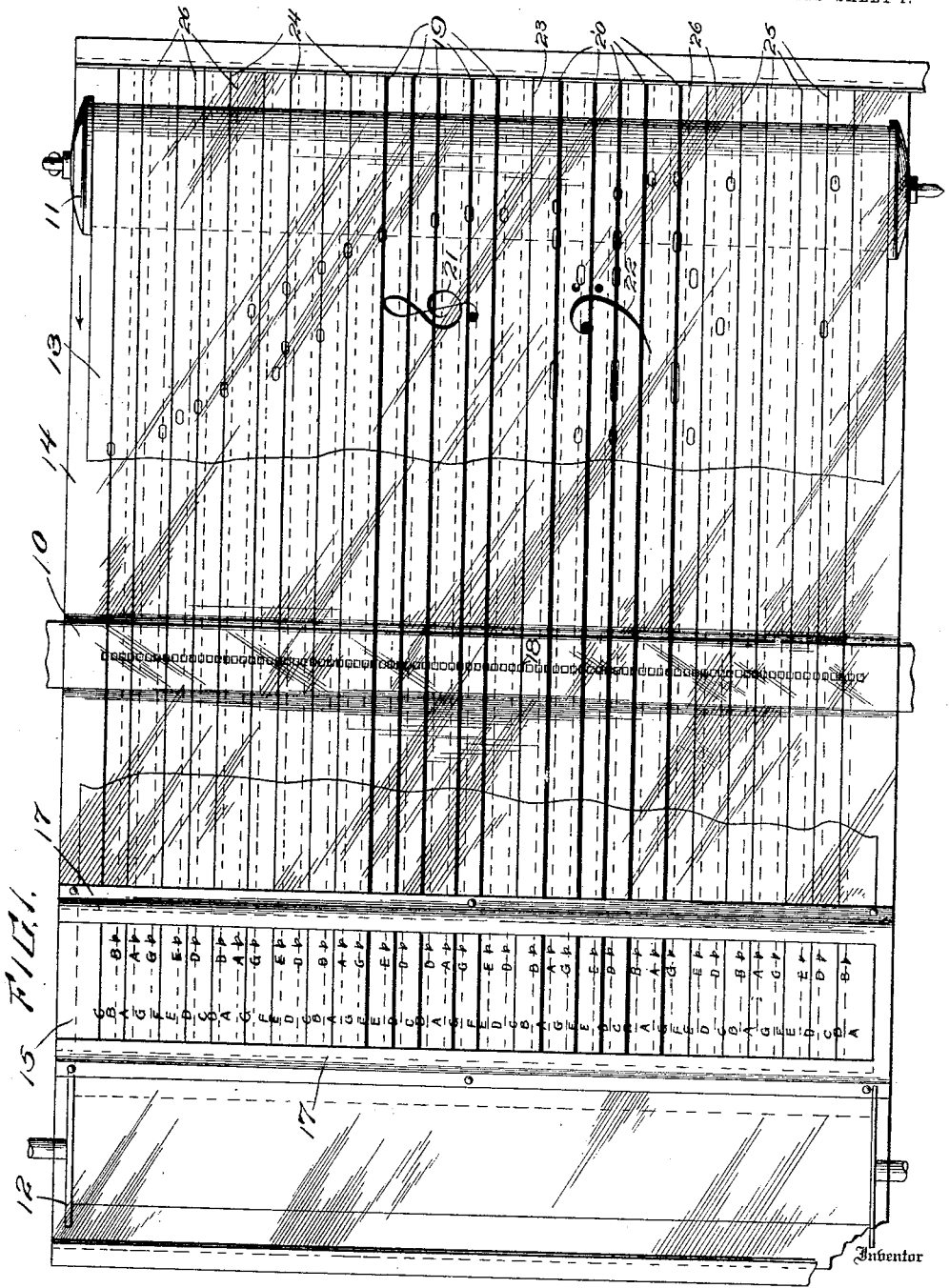

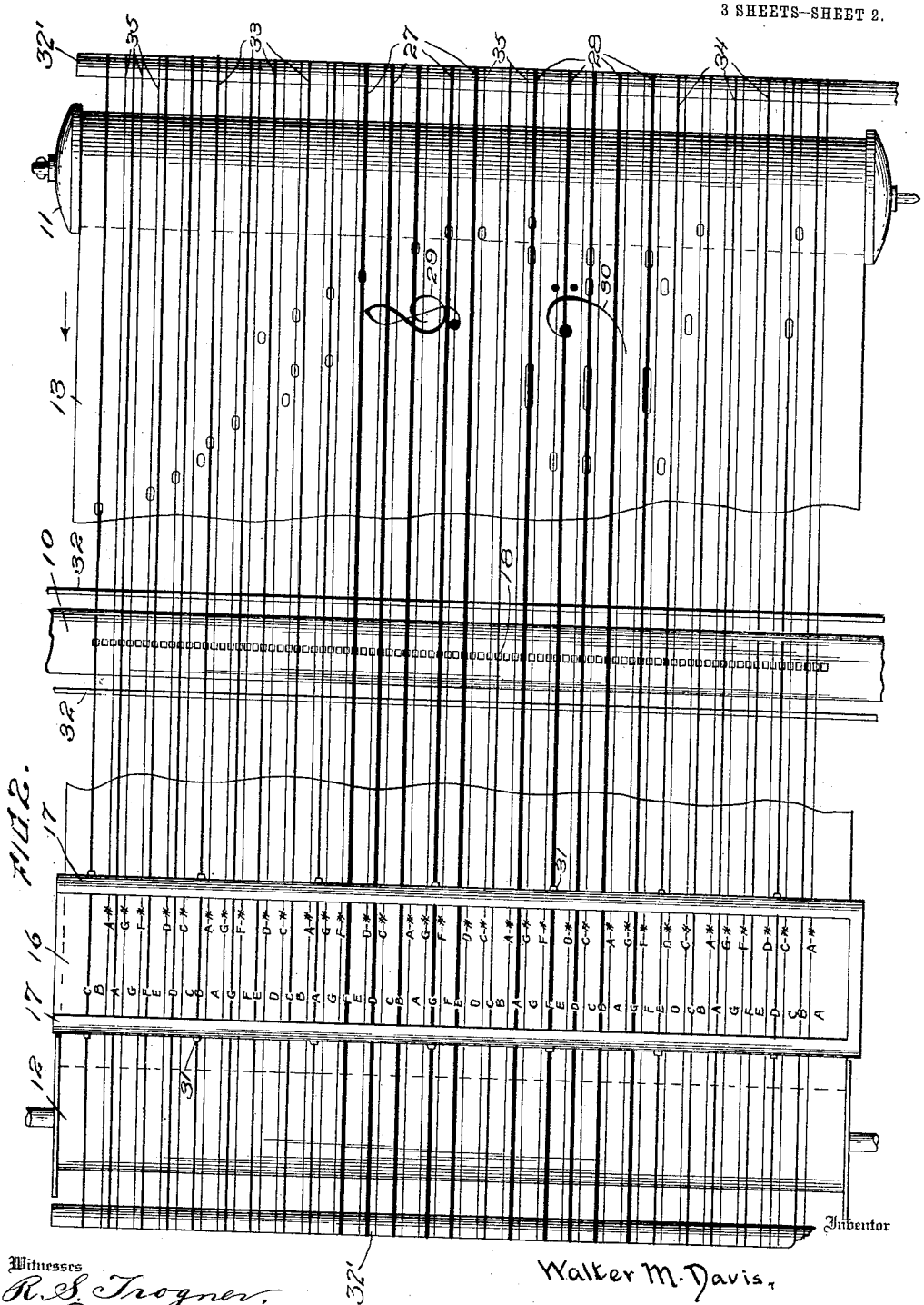

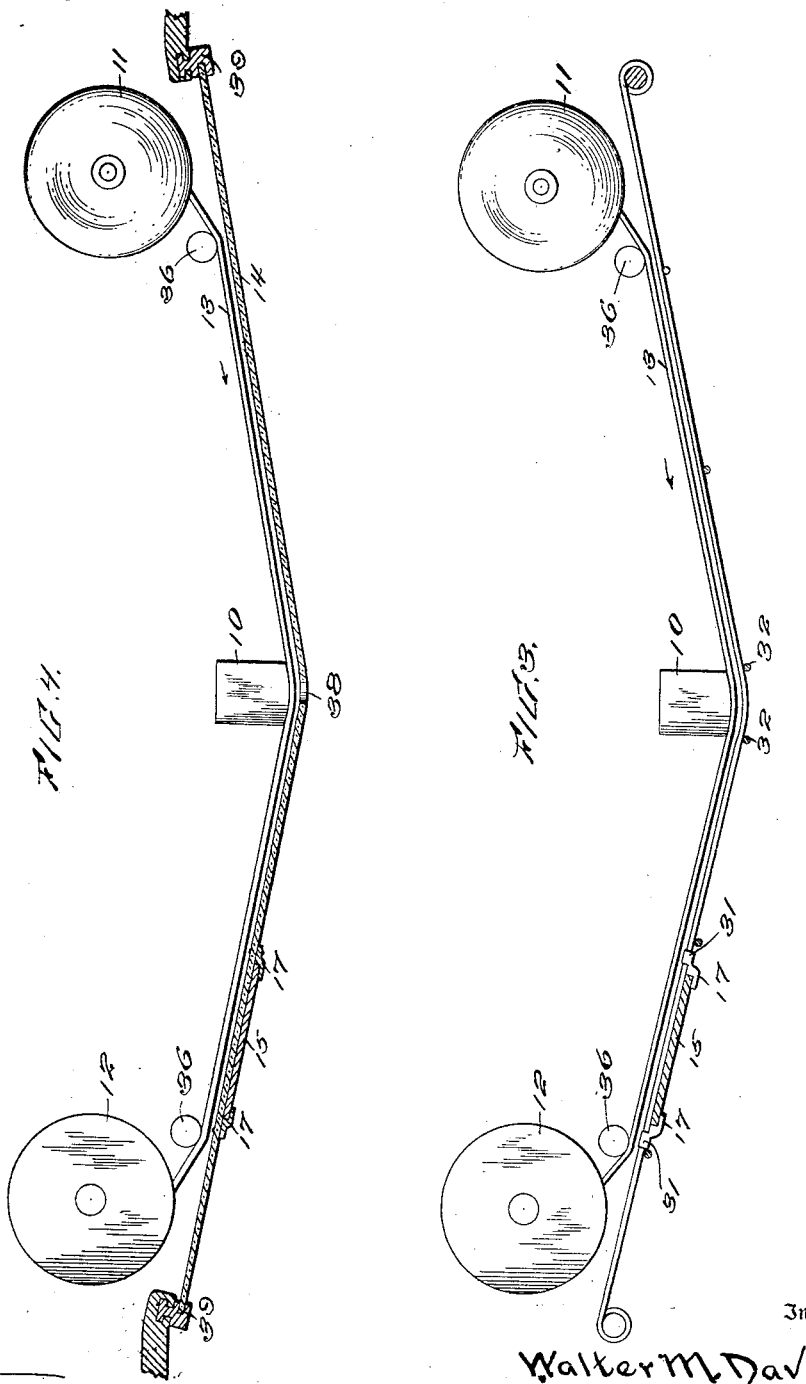

WALTER M. DAVIS.

MUSIC-INDICATOR.

1,131,481.     Specification of Letters Patent.     Patented Mar. 9, 1915.

Application filed December 12, 1913. Serial No. 806,352.

*To all whom it may concern:*

Be it known that I, WALTER M. DAVIS, a citizen of the United States, residing abroad without fixed abode, have invented certain new and useful Improvements in Music-Indicators; and I do hereby declare the following to be a full, clear, and exact description of the invention, such as will enable others skilled in the art to which it appertains to make and use the same.

This invention relates to player pianos and has for an object to provide an indicator to be employed in conjunction with a traveling music sheet, having means for indicating the position of the punched music as it would appear upon the regular staff or staves of written music.

A further object of the invention is to provide a changeable slip marked with a chart whereby sharps or flats may be applied to the notes requiring them.

With these and other objects in view, the invention comprises certain novel constructions, combinations, and arrangements of parts as will be hereinafter more fully described and claimed.

In the drawings: Figure 1 is a view in front elevation of an embodiment of the present invention wherein the indicator consists of a sheet of glass or other transparent material employed as a screen in front of the tracker bar and that portion of the perforated music sheet which is advancing toward it, said screen having leaders in the form of lines marked thereon to simulate the scale. Fig. 2 is a front elevation of an embodiment of the invention wherein the indicator consists of a grid whose wires constitute the leaders which simulate the scale. Fig. 3 is a top plan view of the embodiment of the invention which is shown in Fig. 2. Fig. 4 is a top plan view of the music sheet, including a section of the embodiment shown in Fig. 1.

Like reference characters designate corresponding parts throughout the several views.

The improved music indicator which forms the subject matter of this invention is adapted to be used in conjunction with a player piano having a vertical tracker bar 10 as distinguished from a horizontal tracker bar, and with a music spool 11 and takeup spool 12 of substantially the usual, ordinary type except operating upon vertical axes. It is designed that the mechanism of the player piano with which the chart is to coöperate be such as to move the music sheet 13 from right to left or in the direction indicated by the arrows. The moving of the music sheet in the direction indicated is intended to facilitate singing in accompaniment with the music upon the music sheet by having the words of the song printed directly upon the music sheet and by moving the sheet in the direction indicated to disclose the words of the song in proper sequence and time to the musical accompaniment.

In Fig. 1 is shown a screen consisting of a sheet of transparent material 14, such as glass, celluloid, or the like, the exact material being immaterial to the present invention. At some point upon the screen 14, a chart 15 is employed, which is made interchangeable with a chart 16, as shown at Fig. 2, the only difference being that the chart 15 designates certain notes upon the music sheet as flats of the naturals while the chart 16 designates the same notes as sharps of the naturals. It is to be understood that the two charts 15 and 16 are interchangeable and are held in association with the screen 14 in any approved manner, as by the flanges 17. They may, in fact, be combined into a single slip printed upon the opposite sides to show the letters and lines as shown at Figs. 1 and 2, and may be composed of paper, celluloid, metal, or any approved or convenient material. One of the holes 18 of the tracker bar corresponding to middle C upon the keyboard of the piano is taken as a starting point, and upon opposite sides of such middle C the regular five lines of the treble staff and the regular five lines of the bass staff are designated upon the screen by leaders formed thereon in any approved manner, as by rather heavy lines printed, painted, or otherwise produced upon such screen in two groups with five lines in each group, the lines 19 and 20 passing accurately over the holes in the tracker bar corresponding therewith and extending thence out over the approaching portion of the music sheet and the respective paths of the corresponding perforations therein. The treble and bass staves are preferably designated in the usual manner by the clefs 21 and 22 also produced upon the screen in the same manner as the production of the lines 19. The leaders corresponding with lines between and above and below the staves are preferably designated in some manner distinctive from the leaders corresponding with the lines of the staff, and in Fig. 1 are shown as lighter or finer lines, the line passing middle C being designated as 23, while the light lines above the treble staff are designated as 24, and the light lines below the bass staff designated as 25. It will be understood that the lines actually appearing upon the screen 14 may differ from the lines of the staves either in being lighter, as indicated at Fig. 1, or by a different color, or in any manner to be distinguished from the lines of the staves. The holes of the music sheet and tracker bar corresponding to the black keys of the piano are also designated by leaders distinguished in any manner from the staff leaders. They are in Fig. 1 shown as produced upon the sheet by still lighter or finer and preferably broken lines 26.

The charts 15 and 16, it will be noted have in one column the letters to indicate the naturals positioned upon lines and spaces corresponding to the lines and spaces of the regular music staves, while the sharps and flats of such naturals appearing upon different slips 15 and 16 or upon opposite sides of the same slip are in another column positioned upon the finest or dotted lines so that the full lines, the spaces or the dotted lines may be followed across from the chart to the tracker bar and at that point or any other point upon the exposed music sheet 13 indicate the name of the note perforation appearing under such lines. Assuming that a person singing in accompaniment with the piano would wish to see the music in advance of the actual tone production, the screen to the right of the tracker bar is left unobstructed to a considerable extent so that the music advancing from right to left will be exposed to view and the person viewing the same will be able to determine therefrom the tones yet to be produced.

Instead of an indicator composed of a transparent sheet or screen as shown in Figs. 1 and 4, the present invention contemplates the use of an indicator made in the form of a grid which may be mounted over the tracker bar and the approaching portion of the music sheet in any suitable manner, and the leaders in this form of indicator are wires which are differentiated from each other in some manner. For instance, the lines of the treble and bass staves may be indicated by leaders composed of two groups of heavy wires 27 and 28 with five in each group, the lines above the treble staff at 33 and those below the bass staff at 34, and the single line for middle C by finer wires, and the holes in the music sheet corresponding with the sharps and flats will be indicated by still finer wires 35 throughout the entire grid. The clefs 29 and 30 may be secured upon the heaviest wires as shown, while the flanges 17 will extend across all the wires and be attached thereto in any approved manner, as by clenching ears 31 passing around them. These flanges, together with the cross ribs or rods 32 and 32', serve to make up the entire grid, which latter may be supported in position in any suitable manner. It will be obvious that this form of indicator is capable of the same use as that shown in Fig. 1; and either should be located in juxtaposition to the exposed portion of the music sheet. To accomplish this it is desirable to have the screen curved as indicated at Figs. 3 and 4 to follow the curvature of the sheet as it passes over the tracker bar. As the position of the sheet changes as it winds on and unwinds from the spools it may at times be found desirable to employ auxiliary rollers 36 which maintain the run of the sheet always in the same alinement with the screen.

When a sheet screen of glass, celluloid or the like is employed it is also desirable to provide perforations 38 over the tracker bar as indicated at Fig. 4 to permit the passage of air so that the exhaust mechanism of the pneumatic arrangement is not impeded in any way by the juxtaposition of the screen 14 to the music sheet at the tracker bar. The openings in the grid serve the same purpose.

In Fig. 4 is shown a frame 39 by the use of which the transparent screen 14 may be slid upward to gain access to the music box for inserting and withdrawing the music spool 11.

I claim:

1. The combination with a player piano tracker bar, and a perforated music sheet movable thereover; of a relatively fixed group of leaders extending from the tracker bar along the advancing portion of the sheet so that the latter may be seen between them, the leaders overlying the paths of such perforations as correspond with the notes on the lines of the usual staves, a clef on the leaders, and means for supporting them.

2. The combination with a player piano tracker bar, and a perforated music sheet movable thereover; of a relatively fixed indicator embodying two groups of five leaders extending from the tracker bar along the advancing portion of the sheet and overlying the paths of such of its perforations as correspond with the notes on the lines of the two staves of the usual notation, and a chart removably carried by one edge of said indicator and bearing letters opposite said leaders corresponding with the musical notes which they designate.

3. The combination with a perforated music sheet; of a relatively fixed indicator including two groups of leaders and other leaders parallel with but distinguished from them, and means for supporting the indicator over the music sheet so that the latter may be seen through it, said group-leaders overlying such of the perforations as correspond with the notes on the staff-lines, and the other leaders overlying other perforations in said sheet.

4. The combination with a movable perforated music sheet; of an indicator embodying two groups of heavy leaders and other light leaders parallel with them, and means for supporting the indicator in fixed position with its heavy leaders overlying such of the perforations as correspond with the notes on the staff-lines and its light leaders overlying other perforations in said sheet.

5. The combination with a perforated music sheet, of an indicator embodying two groups of heavy wires with five in each group, means for supporting the indicator with said wires overlying such of the perforations as correspond with the notes on the staff-lines of the ordinary notation, the indicator also embodying other lighter wires overlying perforations corresponding with the notes on added lines, and other still lighter wires overlying perforations corresponding with sharps and flats.

6. An indicator for perforated music sheets comprising a group of five wires spaced to register with such of the perforations in the sheet as correspond with the notes on the respective staff-lines of the usual notation, and means for holding the wires straight.

7. The combination with a player piano tracker bar, and a perforated music sheet; of an indicator embodying a grid having wires in groups properly disposed to overlie the perforations in said sheet which correspond respectively with the notes on the two staves of the usual notation.

8. The combination with a player piano embodying a tracker bar, and a perforated music sheet; of a grid having wires in groups of five each, properly disposed to overlie perforations in said sheet which correspond respectively with the notes on the lines of the two staves, and other wires above and below the groups and between them, for the purpose set forth.

9. The combination with a player piano embodying a tracker bar, and a perforated music sheet; of a grid having horizontal wires in groups of five each, properly disposed to overlie perforations in said sheet which correspond respectively with the notes on the lines of the two staves, and other finer wires to overlie sharps and flats.

10. The combination with a player piano tracker bar, and a perforated music sheet; of an indicator having wires overlying the paths of certain perforations in said sheet, and a chart at one edge of said indicator bearing letters opposite said wires corresponding with the musical notes which they designate.

11. The combination with a perforated music sheet; of an indicator having leaders overlying certain of its perforations, flanges on said indicator, and a chart removably inserted between said flanges and bearing a column of letters disposed opposite the leaders and the spaces between them, and a second column of letters disposed between the letters in the first column and each marked with a sign.

12. The combination with an indicator adapted to overlie a perforated music sheet and having leaders to designate the position of certain perforated notes in said sheet; of flanges on said indicator, and a slip removably and reversibly held by said flanges and containing on each face a chart having in one column letters corresponding with the lines and spaces on a piece of music and in another column letters between the letters of the first column, the letters in the second column on one chart being marked with a flat sign and the similar letters on the other chart being marked with a sharp sign.

13. The combination with an indicator adapted to overlie a perforated music sheet and having leaders to designate the position of the perforations in said sheet, the leaders respectively overlying the notes on the staff-lines being heavy, those overlying added lines being lighter, and those overlying sharps and flats being lighter still; of a removable and reversible sheet mounted at the left end of the indicator and marked on opposite faces with charts and with lines corresponding with said leaders, the chart on one face having a column of letters corresponding with the heavy leaders and spaces between them, and another column having letters and flat signs corresponding with the finest leaders, and the chart on the opposite face having corresponding columns excepting that the letters in the second column are marked with sharp signs.

In testimony whereof I affix my signature in presence of two witnesses.

WALTER M. DAVIS.

Witnesses:
JOHN BAKER,
EMILE BERTRAND.

Copies of this patent may be obtained for five cents each, by addressing the "Commissioner of Patents. Washington, D. C."